Jan. 29, 1935.  H. O. BEATTY  1,989,306
FILTER
Filed Feb. 1, 1932  2 Sheets-Sheet 1
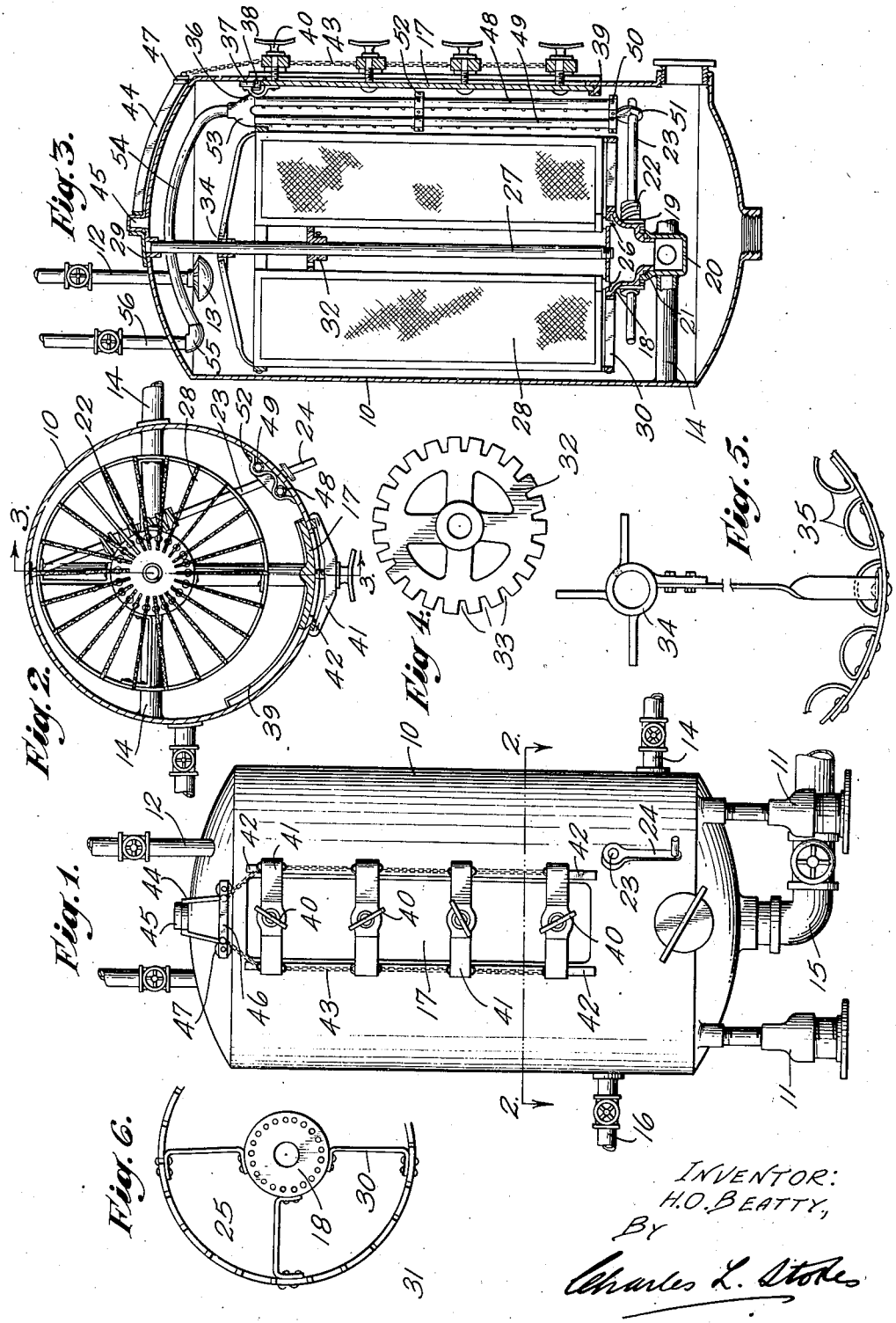
INVENTOR:
H. O. BEATTY,
BY
Charles L. Stokes
ATTORNEY.

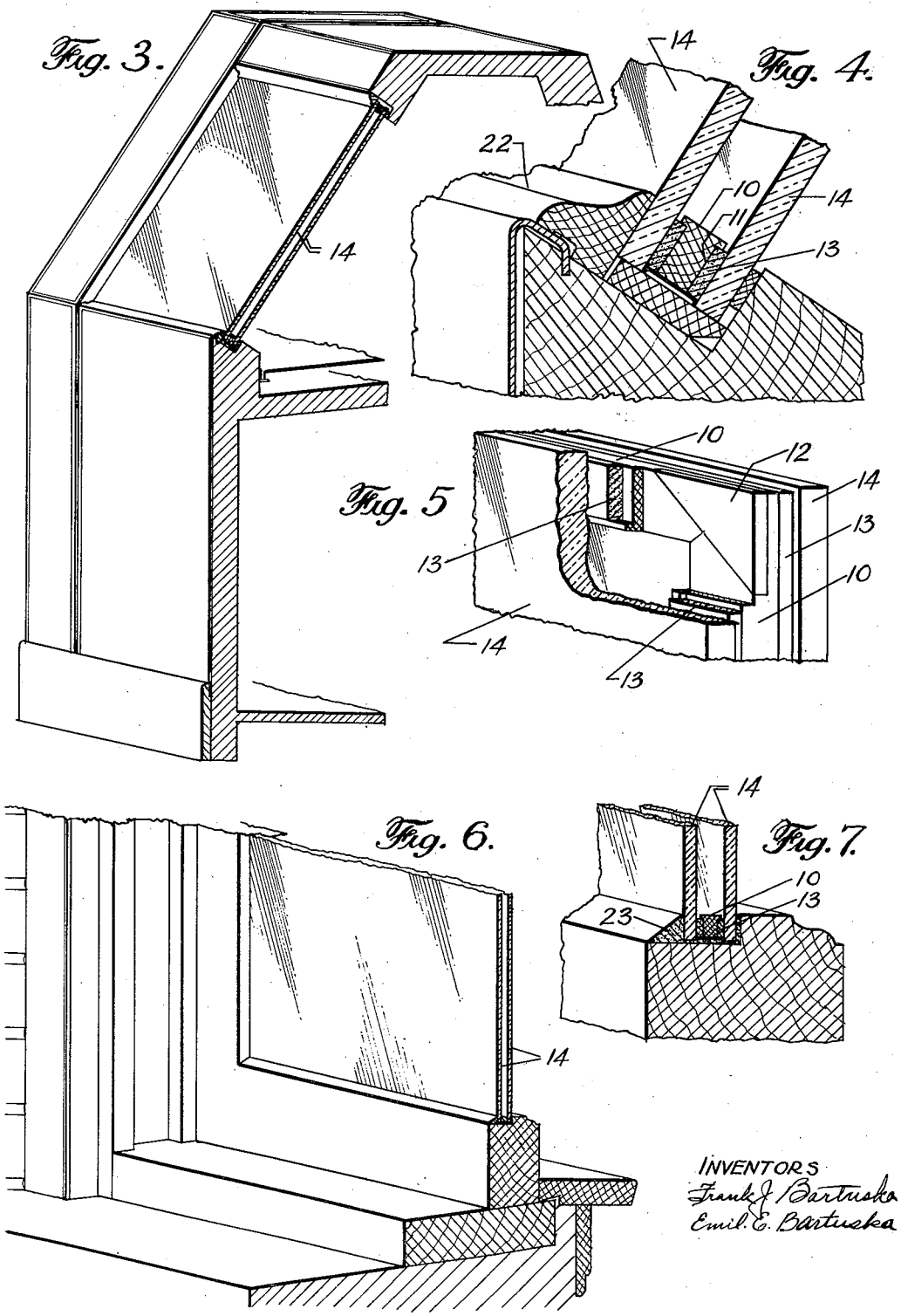

Jan. 29, 1935.    H. O. BEATTY    1,989,306
FILTER
Filed Feb. 1, 1932    2 Sheets-Sheet 2
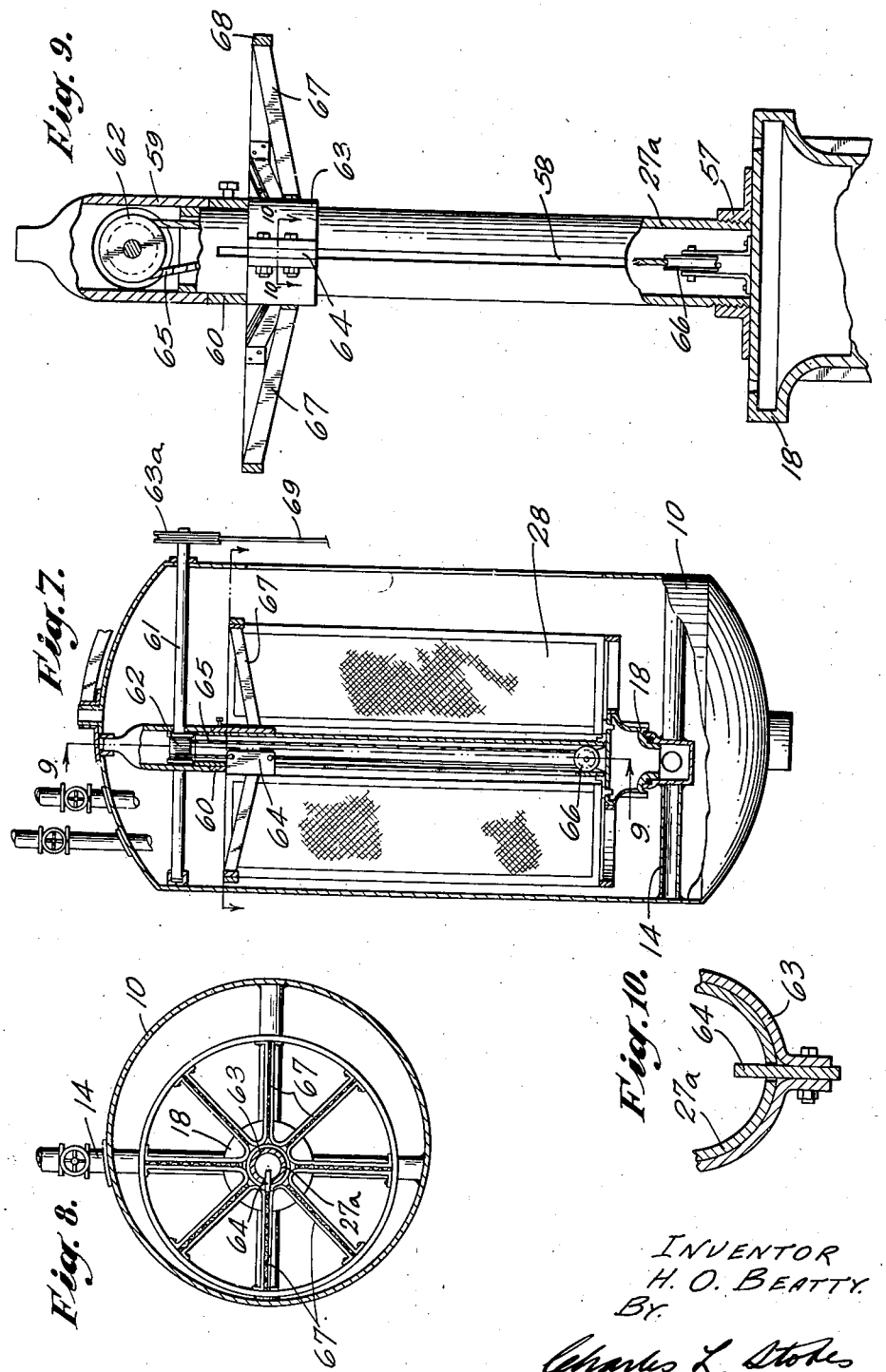
INVENTOR
H. O. BEATTY.
BY
Charles L. Stokes
ATTORNEY.